United States Patent

[11] 3,620,626

| [72] | Inventors | Richard T. Daly<br>Huntington;<br>Edmundas Vambutas, Douglaston, both of N.Y. |
|---|---|---|
| [21] | Appl. No. | 828,945 |
| [22] | Filed | May 29, 1969 |
| [45] | Patented | Nov. 16, 1971 |
| [73] | Assignee | Quantronix Corporation<br>Farmingdale, N.Y. |

[54] PROXIMITY WARNING SYSTEM FOR AIRCRAFT
8 Claims, 6 Drawing Figs.

[52] U.S. Cl. .................................................. 356/4,
356/141, 250/199
[51] Int. Cl. .................................................. G01c 3/08
[50] Field of Search .................................................. 356/4, 5;
343/112.4, 5 DP; 250/199

[56] References Cited
UNITED STATES PATENTS
2,943,201 6/1960 Hicks et al. .................................................. 343/112.4

3,025,514 3/1962 Alexander et al. .................. 343/5 DP
3,053,134 9/1962 Bjornson .................................................. 356/5
FOREIGN PATENTS
957,235 5/1964 Great Britain .................................................. 244/14 L Primary Examiner—Rodney D. Bennett, Jr.
Assistant Examiner—S. C. Buczinski
Attorney—Darby & Darby ABSTRACT: A simple, lightweight, inexpensive laser proximity warning system for aircraft operating under visual flight rules (VFR) conditions. Mounted on each fully equipped aircraft is a laser transmitter, a detector sensitive to laser radiation and a retroreflector. The laser transmitter and detector periodically scan a predetermined region of the space surrounding the aircraft. If another aircraft equipped with a retroreflector is within the predetermined region, the transmitted laser radiation will be returned to the detector which will activate an indicator in the cockpit to warn the pilot of the presence and approximate bearing of the other aircraft.

PATENTED NOV 16 1971  3,620,626

INVENTORS
RICHARD T. DALY
EDMUNDAS VAMBUTAS

BY *Darby + Darby*

ATTORNEYS

INVENTORS
RICHARD T. DALY
EDMUNDAS VAMBUTAS

BY Darby & Darby
ATTORNEYS

PROXIMITY WARNING SYSTEM FOR AIRCRAFT

This invention relates generally to proximity warning systems for aircraft. More particularly, this invention relates to a simple, lightweight, inexpensive laser proximity warning system for general aviation aircraft operating under visual flight rules (VFR) conditions.

It is generally recognized that as the skies become more and more crowded with aircraft of all kinds, the likelihood of collisions between aircraft is increased. Of particular concern is the rapidly growing number of general aviation aircraft which share the congested air lanes between the major cities with larger commercial airliners. Because of size, weight and cost limitations, general aviation aircraft normally do not carry the sophisticated radar, navigation and communications equipment carried by commercial aircraft. Because they lack this equipment, general aviation aircraft are in somewhat greater danger of colliding with other aircraft. It is, therefore, generally recognized by those skilled in the art that it would be desirable to provide a simple but effective proximity warning system having a size, weight and cost which is compatible with general aviation aircraft.

It is, therefore, an object of this invention to provide a simple, lightweight, inexpensive proximity warning system for aircraft.

It is also an object of this invention to provide a proximity warning system including a cockpit display which indicates the approximate bearing of another aircraft within a predetermined range.

Within the limitation of size, weight and cost, a proximity warning system for general aviation aircraft should have a maximum probability of detecting other aircraft which are likely to collide with an aircraft equipped with the warning system. Further, a warning must be provided to the pilot in sufficient time to allow him to avoid the impending collision.

Additionally, in order to preserve the credibility of the system and insure quick pilot reaction when a warning is given, it is desirable to limit to a minimum the number of "false alarms." A "false alarm" is a warning to the pilot when there is actually no danger of impending collision. False alarms may arise from detection errors resulting, for example, from the sun or a sun-illuminated cloud within the field of view of the detector, or they may arise from the detection of an aircraft which does not actually present a danger of collision. Hence, in addition to producing a minimum number of detection errors, the proximity warning system should preferably be able to distinguish between aircraft which present a high probability of collision within a predetermined minimum time, and aircraft which present a low probability of collision within the predetermined minimum time.

It is also an object of this invention to provide a proximity warning system which has a high probability of detecting aircraft which are on a collision course.

It is another object of this invention to provide a proximity warning system having a low probability of producing "false alarms."

It is still another object of this invention to provide a proximity warning system including apparatus for calculating the estimated time to collision with another aircraft within a predetermined range.

It is a further object of this invention to provide a proximity warning system including a cockpit display for indicating the approximate bearing of another aircraft having an estimated time to collision below a certain threshold value.

According to the above and other objects, the present invention provides a proximity warning system in which each aircraft is provided with a retroreflector for reflecting incident light back along the path of incidence. In addition, fully equipped aircraft are provided with a laser device for transmitting a beam of laser light and a detector device having a field of view substantially coextensive with the transmitted beam for detecting laser light reflected back from the retroreflector of another aircraft. A scanning mechanism causes the laser device and the detector to scan a predetermined region of the space surrounding the aircraft, and a cockpit display indicates the approximate direction or bearing of another aircraft within a predetermined range.

In order to reduce to a minimum the number of "false alarms," the preferred form of proximity warning system according to the present invention includes apparatus for determining the rate of closure of another aircraft. This is accomplished by dividing the output of the laser device into two beams separated by a predetermined angle. If another aircraft is within range of the transmitting aircraft, the two beams will impinge successively upon it. If the difference in range, as measured by the reflections (or "echoes") of the two beams exceeds a certain threshold value, a warning will be given to the pilot. On the other hand, if the range as measured by the reflections of the two beams remains approximately constant, no warning will be given to the pilot.

An advantage of the proximity warning system of the present invention is that the equipment installed on each aircraft can be matched approximately to performance requirements for that particular aircraft based on the type of use which is anticipated for the aircraft. For example, if it is anticipated that the aircraft will not be extensively used in congested airways or if the aircraft is equipped with other more sophisticated collision avoidance apparatus, it might carry the retroreflector only. If it is anticipated that the aircraft will be used in congested areas, the scanning device including the laser transmitter and detector and the cockpit display would be installed in addition to the retroreflector. If a reduced "false alarm" rate is required, the aircraft will additionally be provided with the apparatus for computing the closure rate.

Another advantage of the proximity warning system of the present invention is that, if a laser operating in the visible range is used, it will serve as a powerful beacon to assist visual acquisition of the aircraft.

Other objects and advantages of the present invention will be apparent from the following detailed description and accompanying drawings which set forth the principle of the invention and the best mode contemplated for carrying out that principle.

The proximity warning system of the present invention is designed to operate in visibility conditions ranging from "clear" (visibility unlimited) down to the basic minimum for visual flight rules (VFR) in controlled air space (visibility 3 statute miles). The system is designed to have a high probability of detecting potential collision situations while keeping "false alarms" below an acceptable minimum level. It will be apparent that, when visibility is poor, the signal strength of the laser light reflected from the target aircraft will be low, and that the probability of detection will therefore be at a minimum. On the other hand, when visibility is good, the probability of "false alarms" due to direct viewing of the sun or sun-illuminated clouds will be a a maximum. The system is designed to have a detection probability in excess of 90 percent at minimum VFR visibility condition and a false alarm rate of less than 1 per hour when visibility is good.

Figure 1:
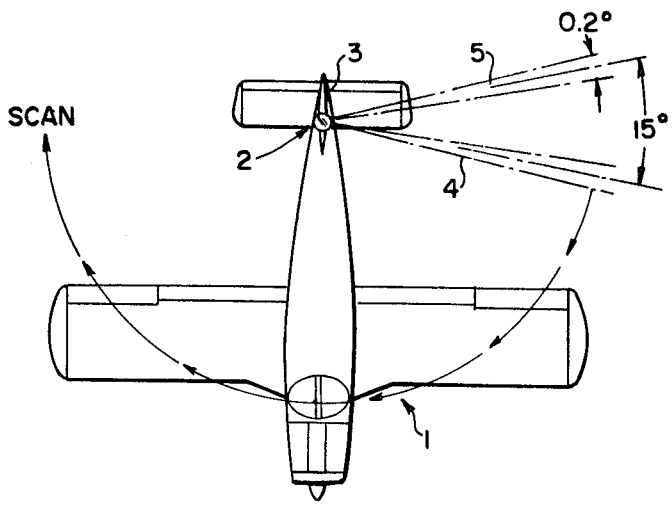
FIG. 1 is a plan view of an aircraft showing the laser transmitter/detector scanning device and retroreflector unit mounted on the tail, and indicating the angular separation and the thickness of the two laser beams.

Referring now to the detailed description of the proximity warning system of the present invention, FIG. 1 is a plan view of the typical light aircraft 1 having the laser transmitter/detector scanning device and retroreflector unit 2 of the present invention mounted on top of its tail assembly 3. As indicated, the laser transmitter/detector scanning device and retroreflector unit 2 produces two output beams or lobes, designated 4 and 5. Each of the output beams 4 and 5 has a thickness, or angular dispersion in the horizontal plane of about 0.2° which amounts to about 20 meters at 3 nautical miles. The two beams 4 and 5 are separated by an angle of about 15° in order to provide separate and distinct reflections from another aircraft on which to base calculations of the range rate, or rate of closure of the other aircraft.

Figure 2:
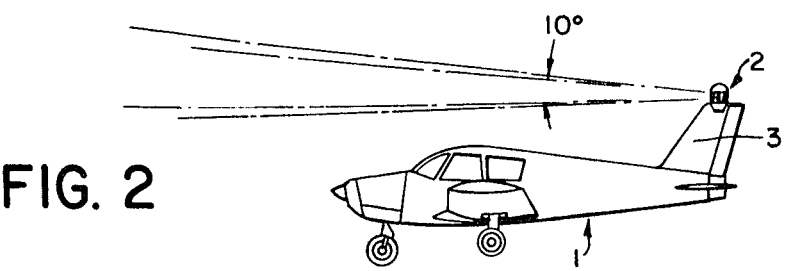
FIG. 2 is a side elevational view of the aircraft shown in FIG. 1 indicating the angular depth of the transmitted laser beam.

FIG. 2 is a side elevational view of the aircraft 1 shown in FIG. 1 with the laser transmitter/detector scanning device and retroreflector unit 2 mounted on top of the tail assembly 3. The depth, or angular dispersion of the laser beams in the vertical plane, is preferably about 10° which amounts to a depth of approximately ½-nautical mile at a range of 3 nautical miles.

Figure 3:
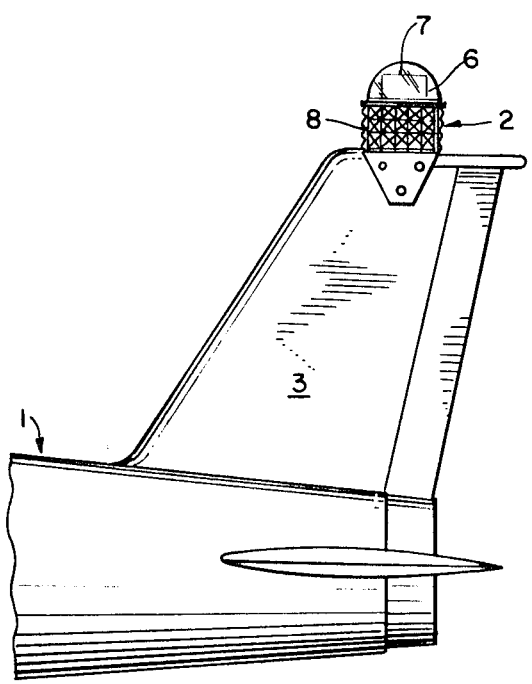
FIG. 3 is a detailed side elevational view of the tail section of the aircraft shown in FIG. 2 showing the laser transmitter/detector device and retroreflector scanning unit.

FIG. 3 is a detailed side elevational view of the tail assembly 3 of the light aircraft 1 shown in FIGS. 1 and 2. The laser transmitter/detector scanning device 7 is protected by a dome 6 which is transparent to light of the frequency produced by the laser transmitter. The dome 6 may be made of glass or plastic and may be tinted to act as a filter which is transparent to light at the frequency produced by the laser transmitter and is more or less opaque to other frequencies in order to filter out "false alarms" due to strong light sources having a frequency different from the laser transmitter. The retroreflector panels 8 are mounted below the transparent dome 6. The retroreflector panels 8 may be simply an array or cluster of small corner reflectors made of highly reflected material such as polished metal or metallized plastic. The entire laser transmitter/detector scanning device and retroreflector unit 2 is mounted on the top of the tail assembly 3 of aircraft 1 by means of a suitable bracket 9.

Although, in the preferred form of the present invention, the laser transmitter/detector scanning device and retroreflector unit 2 is mounted on top of the tail assembly 3 of the aircraft 1, it will be appreciated by those skilled in the art that other locations for the scanning device 7 may be employed within the spirit and scope of the present invention. For example, two scanning units might be employed, one at each wing tip. Alternatively, dorsal and ventral scanning units might be employed. It will further be apparent to those skilled in the art that the retroreflector panels need not be made integral with the scanning unit or units, but might be located at a separate position for positions on the aircraft. However, for reasons of economy or manufacture and simplicity of installation, the scanning unit having integral retroreflector panels is preferred. Similarly, because the vast majority of general aviation aircraft have conventional empennage (with the exception of the "V-tailed" Beech Bonanza and D-18), a single type of scanning device and retroreflector unit suitable for mounting on the top of the tail assembly of the aircraft is preferred to a number of different types of scanning and retroreflector units designed to be mounted at different locations on different aircraft.

Figure 4:
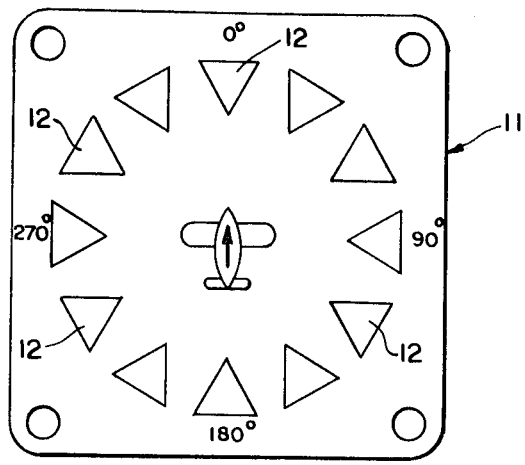
FIG. 4 is a plan view of the preferred form of cockpit display for use in the proximity warning system of the present invention.

Referring now to FIG. 4 of the drawings, there is shown a plan view of the preferred form of cockpit display generally designated 11 for the proximity warning system of the present invention. The display 11 is simply a set of 12 indicator lights 12 arranged to correspond to the 12 points of bearing according to the "o'clock" system favored by pilots. A symbolic representation of the pilot's own aircraft 13 appears at the center of the arrangement of indicator lights 12. If a potential collision situation is detected by the laser transmitter/detector scanning unit and diagnosed by the signal-processing logic, the indicator light 12 corresponding to the approximate bearing of the other "intruder" aircraft lights up. This alerts the pilot to the potential collision situation and indicates to the pilot the approximate bearing of the "intruder" aircraft to assist him in spotting in visually so that he can avoid the danger.

Figure 5:
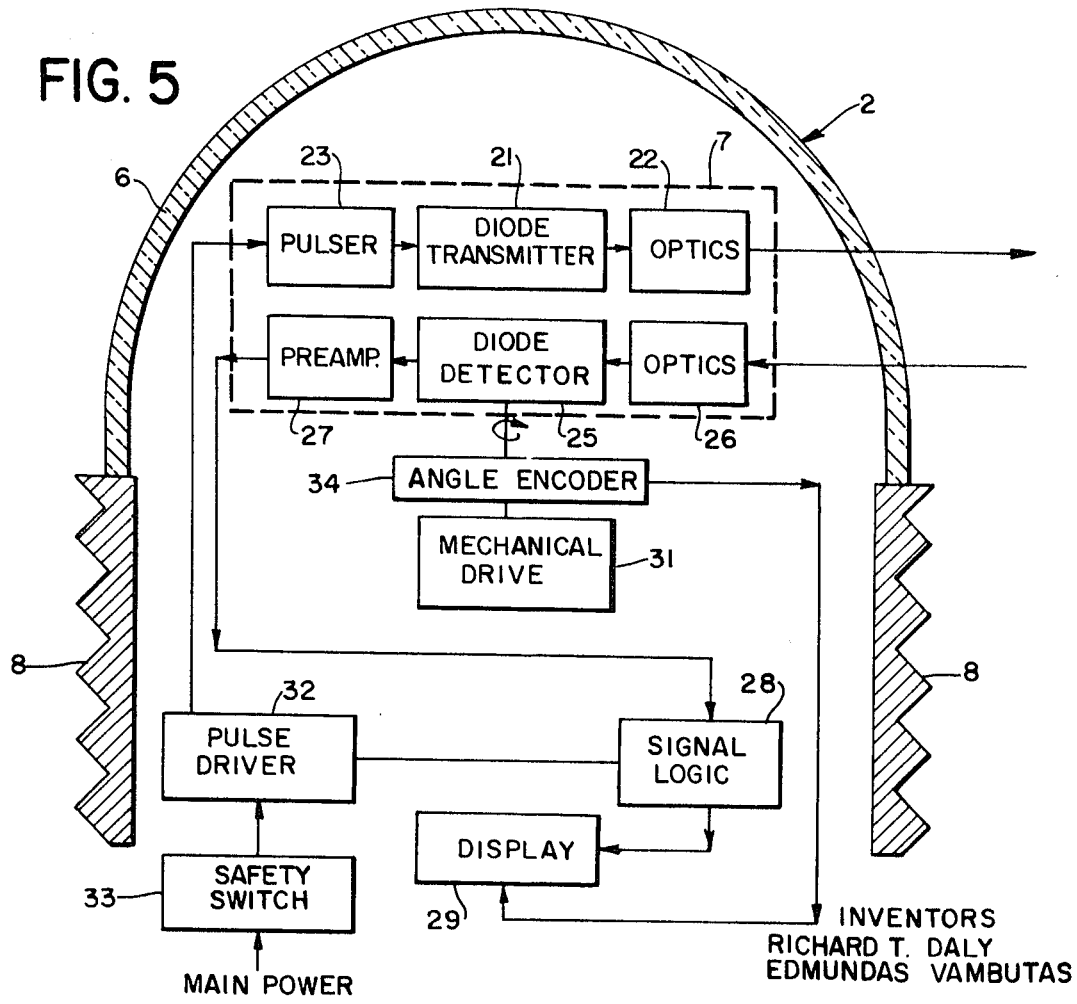
FIG. 5 is a detailed cross-sectional view, partly in block diagram form, of the laser transmitter/detector scanning device and retroreflector panels.

Referring now to FIG. 5 of the drawings, there is shown a detailed cross-sectional view partly in block diagram form, of the laser transmitter/detector scanning device 7 and the retroreflector panels 8. As mentioned above, in connection with FIG. 3, the laser transmitter/detector scanning device 7 is enclosed within a dome 6 which is transparent to the laser radiation. The laser transmitter/detector scanning device 7 includes a laser diode transmitter 21, focusing optics 22 for forming the output of the laser diode transmitter 21 into a beam of the desired shape and a pulser 23 which energizes the laser diode transmitter 21 to produce the required output pulses. The pulser 23 is in turn driven by a pulse driver 32 which also supplies pulses to signal logic 28 for timing purposes which will be explained in greater detail in connection with FIG. 6.

In the preferred form of the present invention, the laser diode transmitter 21 is a gallium arsenide laser diode or, more particularly, an array of gallium arsenide laser diodes of the type well known to those skilled in the art. It will be appreciated, however, that the other types of laser devices may be used within the spirit and scope of the present invention. The characteristics of the gallium arsenide laser diode are, however, well matched to the requirements of the laser proximity warning system of the present invention. For example, for a maximum target range of 2 statute miles under minimum visibility conditions for visual flight rules (visibility 3 statute miles), and assuming an output beam depth of 10°, a retroreflector 10 in. in diameter and 6 in. tall, and an overall optical efficiency of 50 percent including the losses in the optics of the scanning unit, the retroreflector and transmissions through the dome 6, the laser diode transmitter 21 would have to have a peak output power on the order of 200 watts and an average power input on the order of 3 watts. Such a system would have sufficient signal power to reject false alarm due to sun-illuminated clouds which fall within the field of view of the detector, but would not be able to reject false alarms due to direct viewing of the sun itself. In order to reject false alarms due to direct viewing of the sun, the peak output power of the laser transmitter would have to be on the order of 1.5 kw. and the average power input would be on the order of 25 watts.

It will be appreciated by those skilled in the art that the peak power requirements of the laser transmitter depend upon a number of factors in addition to those mentioned hereinabove. More particularly, the minimum peak power $P_x$ of the laser transmitter is given by:

$$P_x \geq \frac{\Pi}{4} \frac{K\Omega_o \delta R^4_{max}(S/N)F^{1/2}(ENI)}{Tf_r a_c A_R \eta T^2_a}$$

where K is the number of laser pulses that can be expected to hit each target during each scan.

$\Omega_o$ is the total scanned volume, ±10° vertically, $2\pi$ radians horizontally, i.e, $(2\pi) \times (0.35)$ sterad.

$\delta$ is the solid angular extent of the retro beam, $10^{-7E-7}$ steradians (corresponding to a 1 arc min. linear beam).

$R_{max}$ is the maximum target range under the minimum visibility condition, i.e., $R_{max} = 3.2 \times 10^3$ meters (2 stat. miles)

(S/N) is the required video circuit signal-to-noise current ratio taken equal to 10 for the sun-viewed case and 15 for the cloud-viewed case.

F is the first preamplifier noise figure, 1.6 or 2 db.

(ENI) is the equivalent noise power input due to background radiation, $9 \times 10^{-7E-8}$ watts.

$Tf_r$ is the product of time to complete a full 360° scan and the transmitter pulse rate = $6 \times 10^3$.

$a_c$ is the projected area of a 10-inch dia. × 6-inch tall cylindrical retroreflector array = 0.04 m.².

$A_R$ is the capture area of the receiver objective $2 \times 10^{-7E-2}$ m.² due to a 3-inch × 10-inch aperture.

η is the overall efficiency including the reflections from R/T optical elements, the triple mirror retroreflector array and transmissions through the IR dome=0.5

$T_a$ is the one way atmospheric transmission taken as 0.14 under minimum VFR conditions.

The pulse width of the laser diode transmitter 21 is preferably on the order of 70 nano seconds and the pulse rate is preferably on the order of 1,000 pulses per second. The time required to complete one full 360°stand is preferably on the order of 6 seconds, which, given a beam width of 0.2°(3 milliradians) gives an opportunity for 3 pulse reflections from each target.

The double fan-shaped laser beams illustrated in FIGS. 1 and 2 are conveniently derived from the particular characteristics and geometry of laser diodes. A laser diode such as, for example, a gallium arsenide laser diode, is a thin, flat, junction-type device typically about 100 microns wide by 3 thousandths of an inch long, the junction being parallel to its broad faces. When current is applied to the laser diode, laser light is emitted from the junction region at both ends of the diode. The emitted laser beams have a fan-shaped configuration which is determined by the thickness of the junction and the width (100 microns) of the ends of the diode. For the purposes of the proximity warning system of the present invention, an array of laser diodes is used to give sufficient output power. The laser diodes are arranged side by side with their ends in alignment and their junctions in the same plane so that a wide fan-shaped beam is emitted and both ends of the array. Each fan-shaped beam passes through an optical system of the conventional type which provides the desired angular dispersion of the output beam. The laser light emitted from one end of the diode array becomes the leading lobe 4 shown in FIG. 1, and the laser light emitted from the other end of the diode array becomes the trailing lobe 5.

Also included in the laser transmitter/detector scanning device 7 shown in FIG. 5 is a diode detector 25 which may be of the conventional type known to those skilled in the art. For example, the diode detector 25 may be a silicon PN junction detector or an avalanche diode. The diode detector 25 receives light through suitable optics 26. The field of view of optics 26 is roughly coextensive with the transmitted laser beams 4 and 5 so as to receive laser light pulses reflected back along the path of transmission by a retroreflector mounted on a target aircraft, but to exclude, insofar as possible, light from extraneous sources which might cause a "false alarm." The output from the diode detector 25 is fed into a preamplifier 27 and the resulting amplified signal is applied to signal processing logic 28 which will be explained in greater detail in connection with FIG. 6. If the signal logic 28 determines that there is a potential collision situation, an alarm signal is generated to activate the cockpit display 29 to warn the pilot of the potential collision situation and indicate to him the approximate bearing of the "intruder" aircraft. The information as to the approximate bearing of the "intruder" aircraft is supplied by angle encoder 34 which senses the angular position of the laser transmitter/detector scanning device 7.

In the preferred form of the present invention, the laser transmitter/detector scanning device 7 is caused to repeatedly scan the horizon by a suitable mechanical drive mechanism 31. In the preferred form of proximity warning system according to the present invention, the laser transmitter/detector scanning device 7 scans 360° in 6 seconds. It will be appreciated, however, that other scanning rates may be employed depending upon particular system requirements.

The mechanical drive 31 and the laser transmitter/detector scanning device 7 are preferably oriented so that the laser beams 4 and 5 shown in FIGS. 1 and 2 sweep around in a horizontal plane when the aircraft 1 is in its normal cruising attitude. Hence, the system will detect other aircraft flying at approximately the same altitude as the aircraft equipped with the scanning device in its normal cruising attitude. Because of the vertical an of the laser beams, the system will continue to detect other aircraft flying at approximately the same altitude when the aircraft equipped with the scanning device is in a normal climbing attitude, a normal descending attitude or a half standard rate turn. If it is desired to maintain the performance of the system at times when the aircraft is in a steeper banking attitude, for example, the drive motor 31 and laser transmitter/detector scanning device 7 may be mounted on a gimballed, gyrostabilized platform.

In order to avoid possible eye damage to persons in the vicinity during ground operation, provision is made for a safety switch 33 to prevent the operation of the laser transmitter 21 while the aircraft is on the ground. The safety switch 33 may be actuated to cut off the main power supply to the pulse driver 32 by the lowering of the landing gear or, alternatively in the case of an aircraft having fixed landing gear, by motion of the shock absorber on the nose wheel for main landing gear. Alternatively, the safety switch 33 might be actuated by a pivot pressure switch to cut off the power to the pulse driver 32 when the air speed falls below a certain value such as, for example, stall speed.

Figure 6:
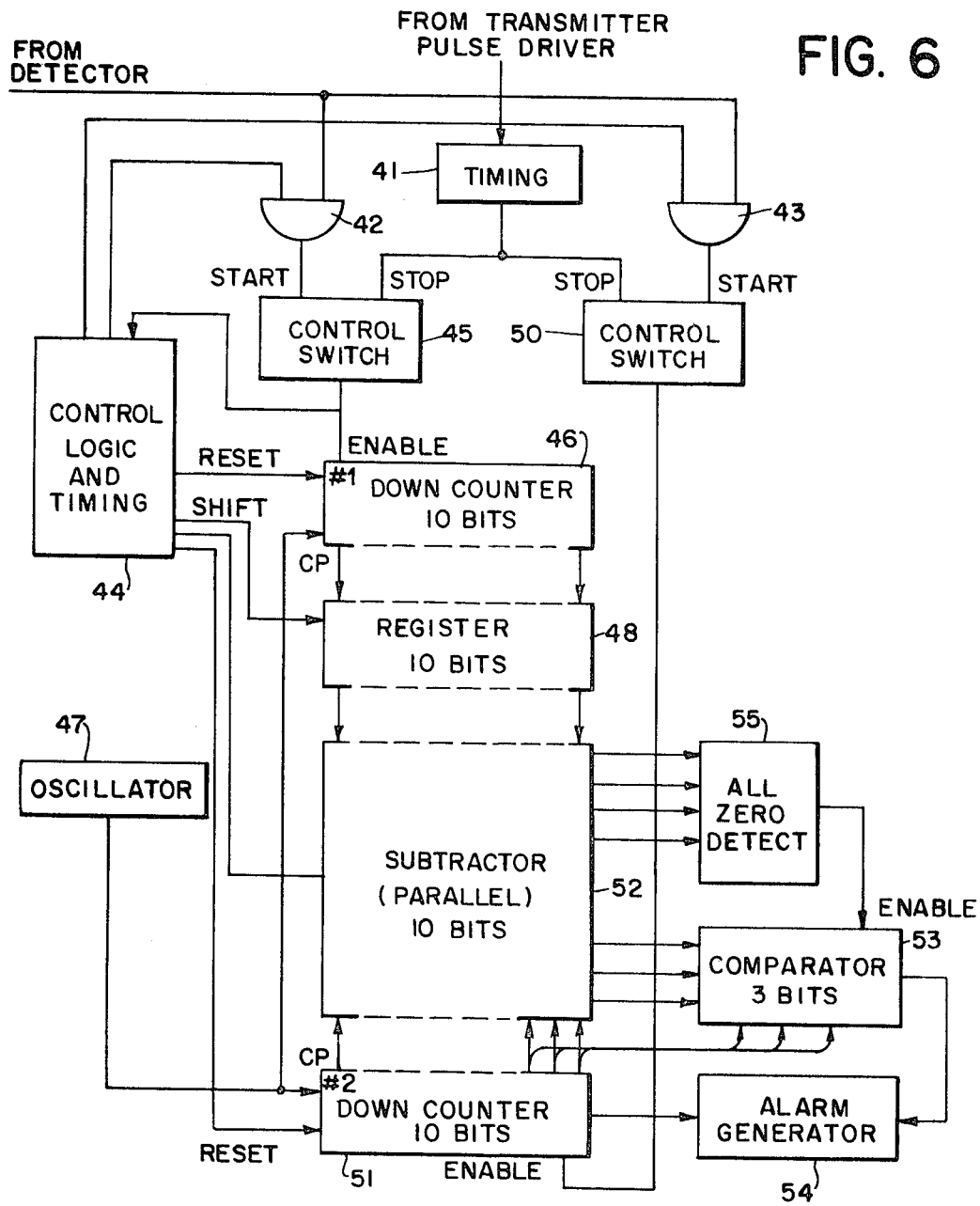
FIG. 6 is a block diagram of the signal-processing logic which distinguishes between potential collision situations and "false alarms."

Referring now to FIG. 6 of the drawings, there is shown a more detailed block diagram of the signal logic 28 shown in FIG. 5. Briefly, the purpose of the signal processing logic shown in FIG. 6 is to reduce the number of "false alarms" by distinguishing nonthreatening "intruder" aircraft from "intruder" aircraft which might be on a collision course. This is accomplished by measuring the range and range rate of the "intruder" aircraft and calculating whether a collision is possible within a predetermined time $\tau_0$. An alarm is given only if the other aircraft presents a danger of collision within the time $\tau_0$. For obvious reasons, $\tau_0$ should be sufficiently large so that, after the alarm is given, the pilot will have sufficient time to visually acquire the "intruder" aircraft and take appropriate evasive action. For example, the nominal value of $\tau_0$ might be 32 seconds. "Intruder" aircraft which do not present a danger of collision within the time $\tau_0$ are deemed to be nonthreatening, and no alarm is given.

Application of the "$\tau_0$" criterion requires the measurement of range $\rho$ and rate $\dot{\rho}$. The range $\rho$ is measured in the conventional way be measuring the time between the transmission of a laser pulse and the detection of the reflected pulse. The range rate $\dot{\rho}$ is calculated from two separate measurements of the target range by the two laser beams 4 and 5 shown in FIG. 1. The two measurements separated by a time interval $\Delta t$ which corresponds to the angle of separation between the two beams 4 and 5. Because of the limit of the range resolving capability of the laser system, the time interval $\Delta t$ cannot be vanishingly small. On the other hand, since the system is spatially unstabilized, the time interval $\Delta t$ cannot be so long that aircraft motion such as yaw or turn introduce a significant change in $\Delta t$. Assuming that the laser beams 4 and 5 sweep at the rate of 60°/sec. (360° in 6 seconds) and that the maximum aircraft yaw rate or turn rate is ±5°/sec., the error in $\Delta t$ will be less than plus or minus 10 percent. Because the minimum range rate which will produce a collision within the time $\tau_0$ occurs at the minimum range $\rho$, nominally 1½ statute miles, and because the range resolving capability of the laser system is on the order of 12 meters, the time separation $\Delta t$ between the two beams 4 and 5 must be greater than or equal to 0.16 second in order to recognize a potential collision situation when the other aircraft is at minimum range of 1½ statute miles. However, in order to simplify signal processing, it is convenient to let the time separation $\Delta t$ equal 0.25 seconds which corresponds to a separation of 15°between the two laser beams 4 and 5.

Referring now to FIG. 6 of the drawings, a timing device 41 is activated by pulse driver 32 of FIG. 5 simultaneously with the transmission of each pulse from the laser diode transmitter 21. The timing device 41 may be a counter or other time measuring device which measures an interval of time $t=2R_{max}/c$ and then automatically resets itself. $R_{max}$ is the minimum forward visible range for VFR flight in controlled air space (3 statute miles) and "c" is the speed of light.

Prior to the receipt of an "echo" by the detector 25 of FIG. 5, gate 42 is opened and gate 43 is inhibited by the control logic and timing device 44.

If no "echo" is received before the timing device 41 has reached $t_1 = 2 R_{max}/c$, it is indicated that there is no target aircraft within the maximum range, $R_{max}$, of 3 statute miles at that particular bearing. If an "echo" arrives after time $t_1 = 2 R_{max}/c$, it is indicated that the target aircraft is beyond the maximum range, $R_{max}$, of 3 statute miles and, accordingly, no alarm should be given to the pilot. The alarm is suppressed by the action of the pulse from timing device 41 to control switch 45 which prevents the detector pulse from gate 42 from operating control switch 45 to start counter 46.

If a detector pulse is received from the detector 25 before time $t_1 = 2 R_{max}/c$, it passes through gate 42 to operate control switch 45 to start the down counter 46 which is driven by the oscillator 47. At the same time, the output pulse from gate 42 is fed into control logic and timing device 44 which operates to inhibit further detector pulses from passing through gate 42.

The down counter 46, which was initially loaded with a number corresponding to $R_{max}$, continues to count down until a time $t_1 = 2R_{max}/c$, after the transmission of the laser pulse which resulted in the "echo." At this time, $t_1$, an output pulse from timing device 41 operates control switch 45 to stop the down counter 46. Then, at time $t_2$, which is ⅛ of 1 second after the receipt of the detector pulse, the contents of down counter 46 are transferred to register 48 under control of control logic and timing device 44. At the same time, $t_2$, the gate 43 is opened to receive the next detector pulse. Because there has been a ⅛ second delay after the receipt of the first detector pulse before opening gate 43, the scanning unit has swept through an angle of approximately 7½° thus ensuring that the next "echo" to be received will be a reflection of the second laser beam 5 and not the first beam 4 shown in FIG. 1.

Approximately ⅛ second later, at time $t_3$, an "echo" resulting from the second laser beam 5 will arrive at the detector 25 of FIG. 5.

The detector pulse passes through the gate 43 and operates control switch 50 to start the down counter 51 which is also driven by the oscillator 47. The counter 51 continues to count down until a time $t_4$ which is $2R_{max}/c$ after the transmission of the last preceding laser pulse. At the time $t_4$ an output pulse from the timing device 41 operates control switch 50 to stop counter 51. The contents of down counter 51 are then subtracted from the contents of register 48 in subtractor 52 under the control of control logic and timing device 44 in order to derive the measured range rate $\rho$. The three lease significant bits of the contents of the subtractor 52 are then compared with the three most significant bits in the counter 51 by a three-bit comparator 53. Using the three most significant bits in the counter 51 (dropping the 7 least significant bits) is equivalent to dividing the contents of the counter 51 by 128 in order to derive the threshold range rate corresponding to $\tau_0 = 32$ seconds. If the three least significant bits in the subtractor 52 (measured range rate) are greater than the three most significant bits in counter 51 (threshold range rate), the comparator 53 actuates alarm generator 54 to warn the pilot of a possible impending collision. The signal from comparator 53 to alarm generator 54 is enabled only if the four most significant bits in subtractor 52 are zero. If the four most significant bits in the subtractor 52 are nonzero, an extremely high range rate, or a malfunction of the system would be indicated. In the case of a malfunction of the system, the "false alarm" should be suppressed, and, in the case of an extremely high range rate, the pilot would have insufficient time to react even if the alarm were given. If the four most significant bits in the subtractor 52 was zero, the all zero detection device 55 produces a signal to enable comparator 53 to actuate alarm generator 54.

The alarm generator 54 is actuated independently of the range rate comparison if down counter 51 overflows. The overflow condition in counter 41 indicates that the range to the target aircraft is less than 1.5 miles.

After the range rate comparison by comparator 53, the signal processing logic is reset to its initial condition in preparation to receive a detector pulse resulting from the detection of another "intruder" aircraft.

While, in the preferred form of the present invention, the signal processing logic shown in FIG. 6 applies a "$\tau_0$"collision criterion in order to reduce the number of "false alarms" to the pilot, it will be appreciated by those skilled in the art that other kinds of signal processing logic capable of applying more sophisticated collision criteria may be used in conjunction with the basic laser transmitter/detector scanning unit and retroreflectors. For example, the signal processing logic might take into account the bearing and bearing rate of the intruder aircraft. Further, it will be apparent to those skilled in the art that the cockpit display might be modified to include indications of the range nd range rate of the "intruder" aircraft in addition to its bearing. Further, the cockpit display might include an indication of the bearing rate and the relative altitude of the "intruder" aircraft.

It will further be apparent to those skilled in the art that other modifications and adaptations of the subject proximity warning system may be made without departing from the spirit and scope of the invention which is set forth with particularity in the appended claims.

What is claimed is:

1. A proximity warning system for warning the pilot of a first aircraft of the proximity of a second aircraft, said proximity warning system comprising:

laser means mounted on said first aircraft for transmitting pulses of light;

retroreflector means mounted on said second aircraft for reflecting incident light back along the path of incidence;

detector means mounted on said first aircraft and having a field of view substantially coextensive with the beam of light transmitted by said laser light transmitter means so as to receive light transmitted by said laser light transmitter means and reflected by said retroreflector means;

timing means for measuring an interval of time equal to the time required for the transmission of an output pulse of laser light from said laser light transmitting means to a retroreflector mounted on a second aircraft at a predetermined maximum range from said first aircraft and back to said detector means mounted on said first aircraft;

means for starting said timing means upon the transmission of an output light pulse from said laser light transmitting means;

down counter means, the initial contents of said down counter means being representative of the predetermined maximum range of said second aircraft;

means responsive to said output signal from said detector means for starting said down counter; and means responsive to said output signal from said timing means to stop said down counter means, the final contents of said down counter means being representative of the range of said second aircraft if said second aircraft is within said predetermined maximum range; and indicator means responsive to said down counter means for indicating the proximity of said second aircraft when said second aircraft is within said predetermined maximum range.

2. The proximity warning system of claim 1 further comprising:

scanning means for causing said light transmitter means and said detector means to scan a predetermined region of the space surrounding said first aircraft;

sensing means responsive to said scanning means for producing an output signal representative of the instantaneous direction of said beam of light from said light transmitter means;

said indicator means being responsive to said output signal from said sensing means to indicate the direction of said second aircraft.

3. The proximity warning system of claim 2 wherein said scanning means causes said light transmitter means and said detector means to scan in a horizontal plane so as to detect a second aircraft flying at approximately the same altitude as said first aircraft.

4. The proximity warning system of claim 1 wherein the time interval between output pulses from said laser light transmitter means is greater than the time required for transmission of light from said laser light transmitter means mounted on said first aircraft to said retroreflector mounted on said second aircraft at a predetermined maximum range and back to said detector means mounted on said first aircraft.

5. The proximity warning system of claim 1 further comprising a safety switch responsive to the airspeed of said first aircraft for shutting off said laser light transmitting means when said airspeed falls below a predetermined minimum speed.

6. The proximity warning system of claim 1 further comprising a safety switch actuated by the landing gear of said first aircraft for shutting off said laser light transmitting means when said aircraft is on the ground.

7. A proximity warning system for warning the pilot of a first aircraft when there is a second aircraft within a predetermined maximum range from said first aircraft and there is a possibility that the second aircraft may collide with said first aircraft within a predetermined minimum time, said proximity warning system comprising:

laser means mounted on said first aircraft for transmitting first and second beams of laser light of a predetermined wavelength, said first and second beams of laser light being separated by a predetermined angle;

retroreflector means mounted on said second aircraft for reflecting incident light back along the path of incidence;

detector means mounted on said first aircraft and having a field of view substantially coextensive with said first and second beams of laser light so as to receive laser light reflected by said retroreflector means mounted on said second aircraft, said detector means producing an output signal upon detection of light of the wavelength produced by said laser means;

scanning means for causing said first and second beams of laser light from said laser means and said field of view of said detector means to scan a predetermined region of the space surrounding said first aircraft;

first calculating means responsible to an output signal from said detector means corresponding to a reflection of said first beam of laser light for calculating the range of said second aircraft relative to said first aircraft;

second calculating means responsive to an output signal from said detector means corresponding to a reflection of said second beam of laser light for calculating the range of said second aircraft relative to said first aircraft;

third calculating means for subtracting the range calculated by said second calculating means from the range calculated by said first calculating means in order to calculate the range rate of said second aircraft relative to said first aircraft;

fourth calculating means for calculating the threshold range rate which would prevent a danger of possible collision within said predetermined minimum time interval;

comparison means for comparing said range rate calculated by said third calculating means with said threshold range rate calculated by said fourth calculating means; and indicating means responsive to said comparison means for indicating a possible collision if said range rate calculated by said third calculating means is greater than said threshold range rate calculated by said fourth calculating means.

8. The proximity warning system of claim 7 further comprising sensing means responsive to said scanning means for producing an output signal representative of the instantaneous direction of said first and second beams of laser light, said indicating means being responsive to said output signal from said sensing means to indicate the bearing of said second aircraft relative to said first aircraft.

* * * * *

UNITED STATES PATENT OFFICE
CERTIFICATE OF CORRECTION

Patent No. 3,620,626　　　　　　　　Dated November 16, 1971

Inventor(s)　Richard T. Daly et al.

It is certified that error appears in the above-identified patent and that said Letters Patent are hereby corrected as shown below:

Col. 4, line 2, change "in" to -- it --;

Col. 4, line 59, change $10^{7E^{1}2}$ to -- $10^{-8}$ --;

Col. 4, line 74, change $2 \times 10^{7E^{1}2}$ to -- $2 \times 10^{-2}$ --.

Col. 4, line 69, change "$9 \times 10^{7E^{1}8}$" to $9 \times 10^{-8}$ --.

Col. 5, line 29, change "and" to -- at --.

Col. 5, line 74, change "an" to -- fan --.

Col. 6, line 41, change "be" to -- by --.

Column 7, line 49, change "lease" to -- least --.

Signed and sealed this 17th day of September 1974.

(SEAL)
Attest:

McCOY M. GIBSON, JR.　　　　　　C. MARSHALL DANN
Attesting Officer　　　　　　　　Commissioner of Patents